May 21, 1957 — A. REDNISS — 2,792,910
CYCLONE SEPARATOR

Filed Oct. 14, 1953 — 2 Sheets-Sheet 1

INVENTOR
ALEXANDER REDNISS
BY Morton Amster
ATTORNEY

May 21, 1957 A. REDNISS 2,792,910
CYCLONE SEPARATOR

Filed Oct. 14, 1953 2 Sheets-Sheet 2

INVENTOR
ALEXANDER REDNISS
BY Morton Amster
ATTORNEY

United States Patent Office 2,792,910
Patented May 21, 1957

2,792,910

CYCLONE SEPARATOR

Alexander Redniss, New York, N. Y.

Application October 14, 1953, Serial No. 385,919

7 Claims. (Cl. 183—85)

This invention relates generally to apparatus for separating solid particles from a gaseous suspension thereof, and more patricularly to separators or dust collectors of the centrifugal type commonly known as cyclone separators.

The cyclone separators in use at present generally have an efficiency of the order of from 70 to 80% on particles about 5 microns in size, due in part to the prevalent use of relatively complex constructive features tending to induce undesired turbulence. Such separators are, for similar reasons, often excessively costly to manufacture, clean, and/or repair, being ordinarily composed of at least two sections, namely an upper cylindrical section into which the gaseous suspension is delivered tangentially or otherwise and a lower conical section from the bottom of which the separated particles are recovered.

It is an object of this invention to provide a cyclone separator having increased separating efficiency. Another object of this invention is the provision of a cyclone separator relatively economical to manufacture and install and simple to clean and repair. Other objects and advantages will become apparent from the following description and accompanying drawings, in which a preferred embodiment of the invention is shown for illustrative purposes only.

Figure 1:
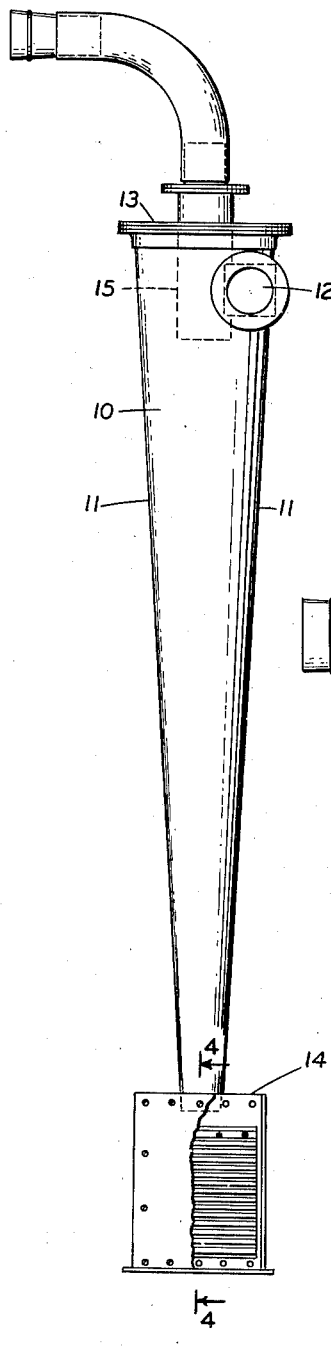
Fig. 1 is a front elevation view, partly in section, of a cyclone separator made in accordance with this invention, supplied at the bottom with a flapper type discharge valve.
Figure 2:
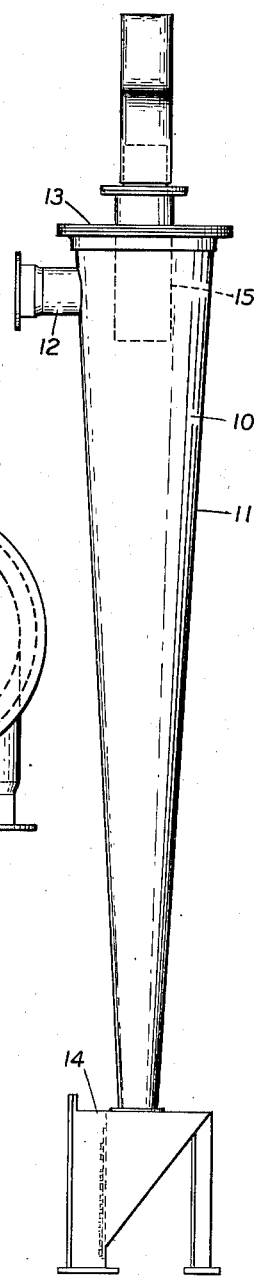
Fig. 2 is a side elevation view of the separator shown in Fig. 1.
Figure 3:
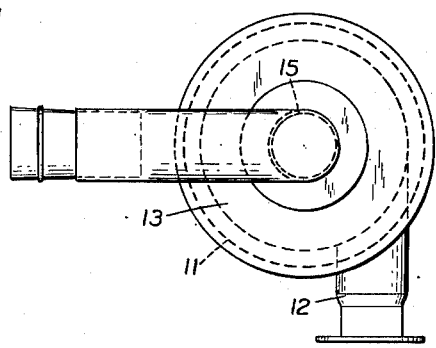
Fig. 3 is a top plan view of the separator shown in Fig. 1.
Figure 4:
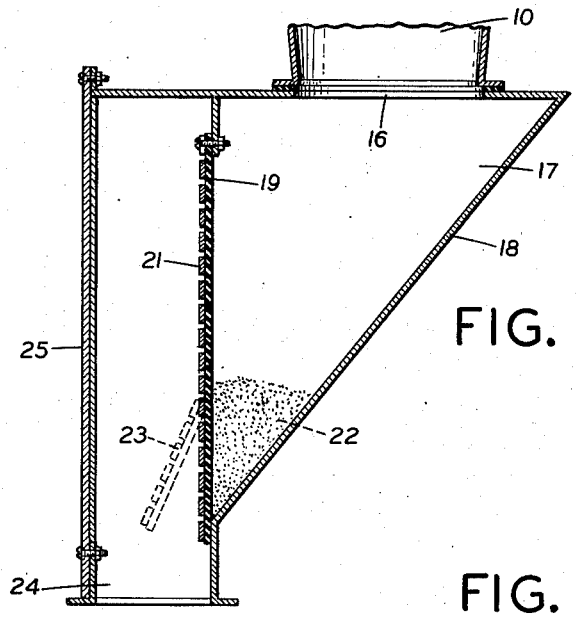
Fig. 4 is an expanded sectional view taken along the line 4—4 of Fig. 1 showing the flapper type discharge valve in more detail.

Referring now to Figs. 1, 2 and 3, reference numeral 10 indicates a vertically disposed cone, the walls 11 of which diverge upwardly preferably at an angle of 5° to 14°. A gaseous inlet conduit 12, for admission of the gaseous suspension of particles desired to be recovered, is mounted laterally and tangentially in the wall of the cone adjacent to the upper edge of the cone and the lid 13. A flapper type discharge valve 14, more fully illustrated in Fig. 4, is mounted at the bottom of the cone to permit recovery of the separated particles. A cylindrical gaseous outlet pipe 15, in coaxial alignment with the cone, extends down through lid 13 to a point in the cone below the lowest part of the gaseous inlet port opening into the cone.

Fig. 4 illustrates the flapper type discharge valve 14 in more detail. As may be seen, the separated particles fall by gravity from cone 10 through discharge opening 16 into enclosure 17 bottomed by an inclined chute 18 whose lower end abuts a vertically hanging, horizontally flexible closure member 19. As shown, the closure member 19 is constructed of a flexible base made of natural or synthetic rubber or the like, reinforced by horizontal strips 21 of a rigid material such as metal, wood, plastic or other natural or synthetic material. It will be readily understood that inclined chute 18 may have any configuration other than as shown, and closure member 19 may be differently constructed to perform the same function. Thus, the reinforcing strips may be mounted on the side of closure member 19 facing enclosure 17, or the closure member may be internally reinforced or may be made entirely of horizontal hinged strips of rigid material. Whatever type of construction is employed, the described flapper type discharge valve has been found to be surprisingly effective in permitting economical and efficient recovery of the separated particles while preventing entry of outside atmosphere into the cone. Thus, when the weight of the separated particles 22 at the lower end of chute 18 is sufficient to overcome the resistance of closure member 19 to flexing, closure member 19 will open as shown at dotted portion 23, by bending along a horizontal axis whereby a portion of the particles will fall into bin 24. Closure member 19 will then close against the decreased weight of collected particles in enclosure 17, and the cycle will be repeated when the weight of collected particles has increased sufficiently. Closure member 19 thus performs a continuously intermittent flapping action which may be observed through a sight glass in cover plate 25. This flapping action permits explusion of recovered particles while preventing entry of outside atmosphere into enclosure 17 and cone 10.

Figure 5:
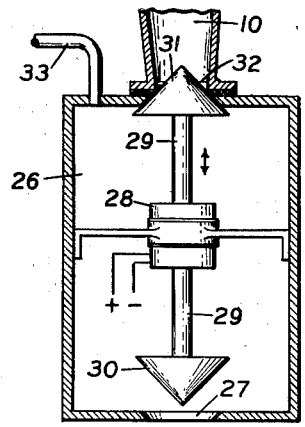
Fig. 5 is an expanded sectional view of a reciprocating type discharge valve which may be substituted for the flapper type valve shown in Figs. 1, 2 and 4.

Fig. 5 illustrates a reciprocating type discharge valve which may be substituted for the flapper type valve described above. As shown, the valve is in position for recovery of separated and collected particles from enclosure 26 through opening 27. In this position, solenoid 28 is actuated to move shaft 29 upward, whereby closure member 30 is withdrawn from opening 27 and closure member 31 is simultaneously forced against opening 32 in the bottom of cone 10. During the upward movement of shaft 29, there is an interval during which neither opening 27 nor opening 32 is closed, whereby outside atmosphere may enter into the cone during vacuum operation thereof. During this interval vacuum may be applied to enclosure 26 by means of vacuum line 33 connected to an exhaust pump not shown. After recovery of the separated particles, solenoid 28 is deactivated whereby shaft 29 and the closure members mounted thereon are permitted to fall by gravity. The solenoid may of course be activated at any desired intervals, automatically or otherwise. It will be understood that the valve may be adjusted to move shaft 29 downwards by actuation of solenoid 28 and upwards by spring tension or other means. It will also be readily understood that a vacuum line similar to line 33 may be connected to the enclosures or bins of any other discharge valve employed for recovering separated particles in accordance with this invention.

Figure 6:
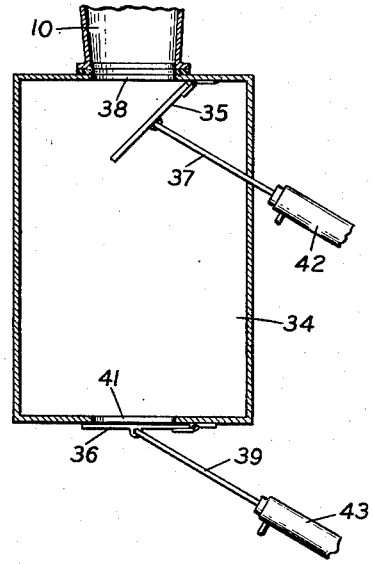
Fig. 6 is an expanded sectional view of a double gate type discharge valve which may be substituted for the flapper type valve shown in Figs. 1, 2 and 4.

Fig. 6 illustrates a double gate type discharge valve which may be substituted for the flapper type valve described above. As shown, the valve is in position for collecting separated particles in enclosure 34, gate 35 being open and gate 36 closed. For recovery of collected particles, shaft 37 is actuated to close gate 35 over opening 38 and shaft 39 is then actuated to open gate 36 over opening 41. Shafts 37 and 39 are actuated by air pistons 42 and 43 respectively, but it will be understood that these air pistons may be replaced by any other actuating means such as solenoids, gears, and the like. The actuating mechanisms should however be manually or automatically controlled to maintain gate 36 closed whenever gate 35 is open.

From the foregoing description, it will be readily understood that a critical feature of the cyclone separator of this invention is the provision of a lateral tangentially arranged gaseous inlet port in the upper wall of the cone itself instead of in a superimposed cylinder as is prevalent in cyclone separators now in use. The particles in the gaseous suspension are thereby immediately subjected to a uniformly increasing or accelerating centrifugal force which enables the attainment of greatly increased separating efficiencies. The instant cyclone separator eliminates the costly frills of construction of present day separators, such as scrolls, shave-offs, differently shaped sections, baffles, vanes, and the like, all of which contribute in various degree to the formation of eddy currents, caking and other undesired deposits in the separator, premature curtailment of applied centrifugal force and other detrimental effects.

It will also be understood that the optimum upward angle of divergence of the cone walls will in general be dependent upon the particular operation in which the separator is employed, and may range from about 5° to 25° or more. However, another feature of this invention is based upon the discovery that angles of divergence within a range of 5° to 14° represent a preferred embodiment because of the further increase in efficiencies attained thereby. Thus the use of such relatively small angles of divergence enables the application of the above-mentioned uniformly increasing centrifugal force to the particles in the gaseous suspension for a longer than normal time, whereby an additional increment of particles is separated. This will become apparent when it is considered that for any given cyclone separator as provided in accordance with this invention, having a given diameter at the upper end, the theoretically attainable height of the separator, and therefore the duration of application of centrifugal forces, will be greater for the smaller angles of divergence. An angle of about 12° has been found preferable for most purposes, although the optimum angle may vary therefrom in any particular instance. The diameter at the bottom outlet end of the cone will be dependent in any particular instance upon the character of the particles and the rate of separation, diameters of about 3" to 12" usually prescribing the extreme values for optimum physical convenience of collecting and recovering the particles.

Because of the various constructive features of the cyclone separator made in accordance with this invention, high efficiencies are attained under heavy dust loadings. When cyclone separators heretofore in use are subjected to heavy dust loadings, there is a tendency for some of the centrifugal force imparted to the gaseous suspension to become dissipated by contact with irregular inner surfaces of the separators and by friction between particles causing eddy currents, which in turn cause loss of a considerable amount of particles in the high velocity exit gases. It has been found that due to the higher efficiency of the instant separator, dust loadings may be handled when in excess of 60 grains per C. F. M. under vacuum operation, as compared with other separators operating within the range of 10 to 20 grains per C. F. M.

The cyclone separator of this invention is operative for separating particles of any shape, weight or size down to 1 micron or less. Thus, proven efficiencies of at least 94% have been attained in separating from gaseous suspensions 75% wettable DDT powder with an average size of 2 microns. When employed in lime kiln exhaust gases containing fly ash and lime particles with an average screen size of 95% through No. 325 mesh, an efficiency of 95% has been attained under a static pressure of 4½" water gauge. High efficiencies are also attained when the instant separator is employed in cement plant exhausts, in the gaseous conveying of particulate material, in collecting spray dried particles, and many other uses.

The instant separator may be employed under pressure conditions in which the gaseous suspension is forced into the separator at a pressure above atmospheric, or under vacuum conditions in which the gaseous suspension is pulled into the separator by suction applied at the gaseous outlet pipe, or a combination of force feed and outlet suction may be employed. It has been found that for attainment of high separation efficiencies, particularly when operating under conditions in which the pressure within the separator is below atmospheric as in most applications, it is important to employ a valve adapted to prevent entry of outside atmosphere into the cone, which latter would cause turbulence and imbalance within the cone resulting in considerable loss of particles in the exit gases. While several types of suitable solids discharge valves have been described, it will be readily understood that others may be employed, such as rotary valves and the like, provided they perform the desired function. The flapper type discharge valve described hereinabove is however preferred because of its economy, simplicity, and surprisingly high efficiency.

It will be also understood that the cyclone separators of this invention may be constructed in any size required for handling the particular gas velocities, particle sizes, densities, and the like, prevalent in a particular usage. Thus, one use of the instant separator called for a cone with a height of 20 feet, an upper diameter of 4 feet and a lower discharge opening diameter of 5 inches, whereas another use called for a cone with a height of 6 feet, an upper diameter of 13½ inches and a lower discharge opening of 3 inches diameter. Obviously, separators made in accordance with this invention may be employed with particular advantage in any number in series or parallel relationship as required. When so employed, the compactness of the assembly, reduction in length of ducts and elimination of the necessity for complicated and heavy structural supports, etc., result in highly desirable economic and operational advantages. Other modifications and variations of this invention will be obvious to the person skilled in the art and it is to be understood that such modifications and variations are included within the purview of this application and the spirit and scope of the appended claims.

What is claimed is:

1. A cyclone separator for separating solid particles from a gaseous suspension containing the same, said cyclone separator consisting of a single vertically disposed separating chamber having a wall in the shape of a continuous frustrum of a cone having a conical ange of 5° to 14° diverging upwardly, a lateral tangentially arranged gaseous inlet port in the wall of the cone adjacent the top edge thereof, a solids discharge valve at the bottom of the cone, a lid seated directly on and covering the top of the cone, and a cylindrical unobstructed gaseous outlet pipe in coaxial alignment with the cone and extending down through the lid to a point below the lowest part of said inlet port.

2. A separator as defined in claim 1 wherein said conical angle is about 12°.

3. A separator as defined in claim 1 wherein the said valve is of the flapper type.

4. A separator as defined in claim 1 wherein the said valve is of the reciprocating type.

5. A separator as defined in claim 1 wherein the said valve is of the double gate type.

6. A separator as defined in claim 1 wherein the said valve is adapted to prevent entry of outside atmosphere into the cone during vacuum operation.

7. A cyclone separator for separating solid particles from a gaseous suspension containing the same, said cyclone separator consisting of a single vertically disposed separating chamber having a wall in the shape of a frustrum of a cone having a conical angle of 5° to 14° diverging upwardly, a lateral tangentially arranged gaseous inlet port in the wall of the cone adjacent the top edge thereof, a solids discharge valve at the bottom of the cone, a lid covering the top of the cone, and a cylindrical unobstructed gaseous outlet pipe in coaxial alignment with the cone and extending down through the lid to a point below the lowest part of said inlet port, said valve being of the flapper type comprising an inclined chute the lower end of which abuts a vertically hanging horizontal flexible closure member composed of a rubbery base material reinforced by spaced horizontal strips of a rigid material.

References Cited in the file of this patent

UNITED STATES PATENTS

| | | |
|---|---|---|
| 371,851 | Merrill | Oct. 18, 1887 |
| 1,454,492 | Stroud | May 8, 1923 |
| 1,509,910 | Stebbins | Sept. 30, 1924 |
| 1,854,738 | Hays | Apr. 19, 1932 |
| 2,377,524 | Samson et al. | June 5, 1945 |
| 2,616,563 | Hebb | Nov. 4, 1952 |

FOREIGN PATENTS

| | | |
|---|---|---|
| 4,227 | Great Britain | Mar. 19, 1888 |
| 170,856 | Austria | Apr. 10, 1952 |
| 344,421 | Great Britain | Mar. 2, 1931 |